United States Patent Office

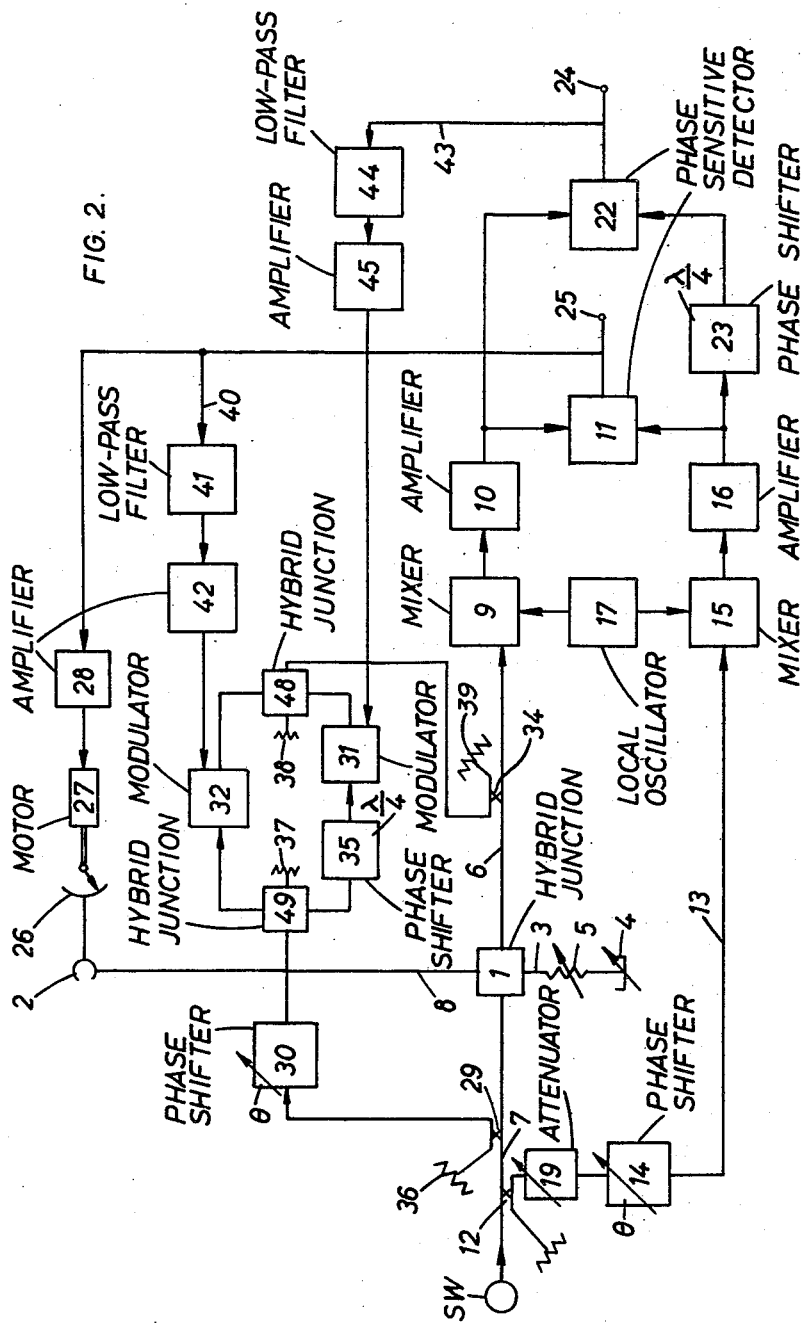

3,197,707
Patented July 27, 1965

1

3,197,707
MICROWAVE FREQUENCY DISCRIMINATORS
Allan Stanley Wiltshire and Sidney Albert Drage, both of Malvern, England, assignors to James Scott (Electronic Engineering) Limited, Glasgow, Scotland
Filed Nov. 27, 1961, Ser. No. 155,136
Claims priority, application Great Britain, Nov. 28, 1960, 40,798/60
10 Claims. (Cl. 325—487)

This invention relates to microwave frequency discriminators and particularly to such discriminators of the bridge type.

Certain microwave structures, e.g. hybrid junctions, exhibit properties comparable with a classical bridge circuit in that zero output may be obtained when certain elements of the structure are balanced. Such a microwave arrangement is referred to hereinafter as a "microwave bridge."

One of the applications of a microwave frequency discriminator is in the examination of unwanted noise modulations in the output of a continuous wave klystron oscillator.

Any practical oscillator has a power spectrum of finite proportions, i.e. the assumption frequently made for convenience is not true because the output power is in fact not confined to a particular frequency but has a spectrum in which most of the output power is confined to a narrow band of frequencies in the region of maximum output with small but measurable power emitted over a range above and below the center frequency. This low-order power spectrum is produced by certain imperfections and instabilities in the source generator, its power supplies and associated circuits and generally has the characteristics of noise.

When the generated noise spectrum extends into the region of transmitted intelligence in a communications system, its presence will impose a limit on the maximum level at which intelligence may be transmitted, received and detected. It is therefore desirable to provide means for determining the noise power spectrum of the generator in regions corresponding to the required bands of intelligence transmission and the present invention aims at providing such means.

If the communications system is of the frequency modulated (FM) type it is desirable to provide means for determining the FM component of the noise spectrum, and similarly if the system is of the amplitude modulated (AM) type. If the system is of the narrow band, high resolution type, for example a CW radar, then it is necessary to determine the noise power spectrum with a resolution at least as high as the resolution of the radar receiver for the measured results to be meaningful.

For convenience the performance criteria may be arbitrarily defined as:

(1) "Long-term" variations in the frequency and amplitude of the output from the oscillator, including cyclic variations having periods of hours, minutes, seconds etc.;

(2) "Medium-term" variations with cyclic components having frequencies ranging from 1 or 2 cycles per second (c./s.) to about 100 c./s.;

(3) "Short-term" variations in the region of 100 to 100,000 c./s., and;

2

(4) "Very short-term" variations from 100,000 c./s. upwards.

Generally it is impractical to devise a system to measure the instabilities occurring in all the above regions at the same time and with equal sensitivity. In practice the alternative systems are designed to provide optimum performance in one or two regions of specific interest. Thus a microwave frequency discriminator of the type disclosed in U.S. Patent No. 2,883,533, with electro-mechanical switching of the output signals to the phase-sensitive detector, would provide signals capable of measuring and controlling "long-term" variations, but would not respond to higher order variations of the order of several hundred c./s.

Discriminators like that disclosed in U.S. Patent No. 2,770,729, which by their mode of behavior generate noise extending into the wanted signal spectrum region at levels higher than the noise generated in klystron oscillators under the best possible conditions, may be satisfactory for stabilizing the mean frequency output of a klystron relative to the setting of a standard resonant cavity, but are unable, because of an internal noise limitation, to transmit the low level, higher order noise present in the output from the control oscillator and therefore are unresponsive to noise fluctuations occurring in this region.

U.S. Patent No. 3,079,563 relates to a microwave frequency discriminator having an input arm to which a noise-modulated carrier signal is fed, an arm connected to a resonant cavity, an arm containing a balancing impedance, and an arm connected to a phase-sensitive detector which has applied to it a reference signal derived from the input arm. This discriminator is capable of responding with high sensitivity to "short-term" variations in the output from a stable klystron oscillator. Because of this high sensitivity the discriminator is also capable of resolving "long-term" and "medium-term" fluctuations, subject to the resonant cavity remaining stable. Depending on the stability of the high frequency source it has been found practicable to achieve carrier cancellation ratios of from 30 db to 50 db with this discriminator using manual tuning means for the cavity. Highly sensitive though this discriminator is, the continuing advances in microwave technique have led to a requirement to achieve carrier cancellation ratios of a higher order so that the limiting sensitivity of the system could be correspondingly improved.

Such an increase in sensitivity could be attempted by increasing the power of the input signal. However this suffers from the disadvantage of increasing the chance of "burn-out" of crystals used in the signal channel, and the flicker noise in the crystals is also more likely to be increased. Accordingly the present invention aims at providing a microwave frequency discriminator including a resonant cavity which is automatically tuned by a feedback loop so that the carrier is cancelled despite "long-term" frequency variations.

According to a further preferred feature of the present invention a second feed-back loop is provided to suppress "medium-term" variations in the carrier signals.

One example of a discriminator of the present invention will now be described with reference to the accompanying drawings in which:

FIG. 2 is the circuit of one discriminator of the present invention, and

A description of the basic structure of the discriminator will be given first and followed by a description of added control loops according to the invention which automatically control the balance of the discriminator bridge.

Figure 1:
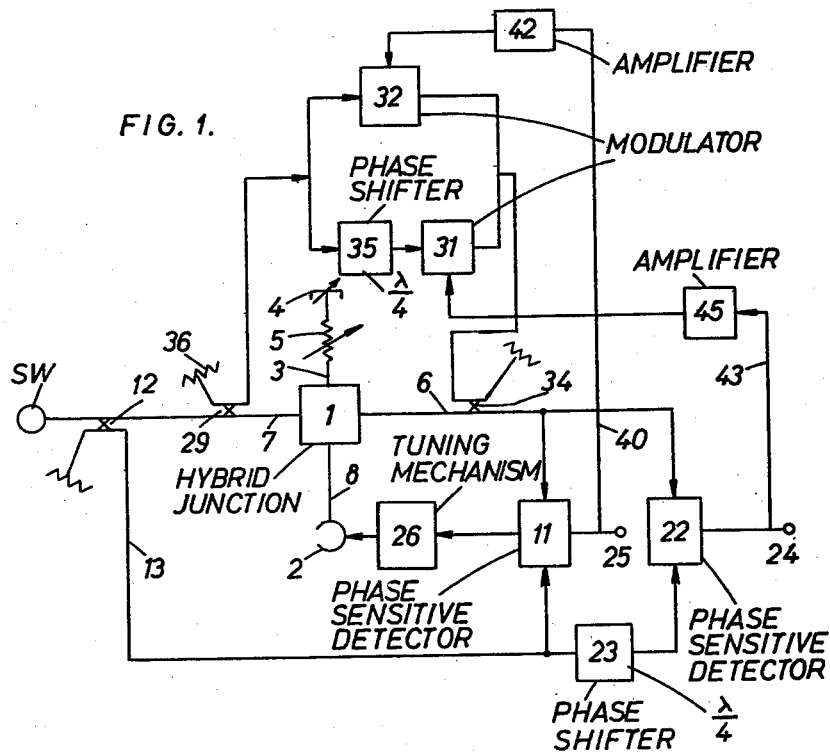
FIG. 1 is a block diagram of the basic circuit.

As shown diagrammatically in FIG. 1, the signal of which the noise modulation is to be measured passes from the source SW along an input arm 7 to a hybrid junction 1 having a balancing arm 3 including a variable attenuator 5 and a variable short circuit 4, an arm 8 leading to a cavity resonator 2, and an output arm 6 leading to a first phase-sensitive detector 11 and a second detector 22.

Input reference signals in the arm 7 also pass through a directional coupler 12 and channel 13 to the detector 11 and through a 90° phase shifter 23 to the detector 22.

One output from the detector 11 passes to means 26 for tuning the cavity 2. A second output passes through an amplifier 42 to an adjustable attenuator 32 in one branch of a parallel attenuating circuit in the other branch of which is a 90° phase shifter 35 and an adjustable attenuator 31 connected through an amplifier 45 and channel 43 to the output of the second detector 22. The attenuators 31 and 32 are preferably electrically adjustable.

Equal signals are passed into both halves of the parallel attentuating circuit from the input arm 7 through a directional coupler 29 having a balancing impedance 36.

The output of the parallel circuit passes through a directional coupler 34 to the output arm 6, before the first detector 11.

By this means the signal in the arm 6 has applied to it one component in phase and another component in quadrature with the carrier of the input signal, each of the components being controlled by one of the detectors by means of the control amplifiers and electrically adjustable attenuators.

A preferred example of the present invention is illustrated in FIG. 2, in which parts indentical with those described in FIG. 1 have the same references.

In FIG. 2 the microwave bridge is formed by a hybrid coupling 1 (a three db directional coupling) to which is connected a resonant cavity 2, a balancing arm 3 terminated by a variable short-circuit 4 and containing a variable attenuator 5, an output arm 6 and an input arm 7 arranged to be fed from a source SW of which the noise modulation is desired to be measured. The output arm 6 of the bridge is connected via a mixer 9 and an intermediate frequency (I.F.) signal amplifier 10 to a phase sensitive detector 11.

The bridge is balanced by adjustment of the variable attenuator 5 and the adjustable short circuit 4; the zero output point of the bridge occurs when the source carrier frequency and cavity resonant frequency are equal.

If a frequency deviation is present in the feed from the source SW then an output signal appears in the output arm 6 of the bridge.

A reference signal for the phase sensitive detector 11 is obtained from the source SW by means of a directional coupling 12 which is inserted in series with the input arm 7 of the microwave bridge. The directional coupling 12 couples to a reference channel 13 which contains an adjustable attenuator 19, and adjustable phase shifter 14, a mixer 15 and an I.F. reference signal amplifier 16 of which the output is fed as a reference signal to the phase sensitive detector 11. The mixers 9 and 15 are fed from a common local oscillator 17.

The output of the phase sensitive detector 11 varies in amplitude correspondingly to the frequency deviation originally present in the input signal to the bridge from the source SW.

The signal fed to the phase sensitive detector 11 is insensitive to amplitude modulations present in the original signal.

A sensitive indication of amplitude modulation is obtained by a second phase sensitive detector 22 provided as shown and fed from the I.F. signal and reference amplifiers 10 and 16 respectively, a 90° phase-shifter 23 being connected in series with the reference signal input. The signal then appearing at the output 24 of the second detector 22 gives a measure of the amplitude modulation present in the signal input to the bridge.

The sensitivity of the discriminator—that is the sensitivity of FM to AM conversion—can be varied by adjusting the power level input of the bridge from the source SW; the attenuator 19 in the reference channel 13 can be calibrated and its setting necessary to maintain, for a given balance of the bridge, a pre-determined reference signal level at the phase sensitive detector 11, will be a measure of the change in sensitivity.

A first control loop for automatic control of bridge balance is provided by a cavity adjustment mechanism 26, shown diagrammatically only, and a motor 27 which drives the mechanism 26 in response to frequency error signals appearing at the output (terminal 25) of the first phase-sensitive detector 11; the frequency error signals are applied to the motor 27 through an amplifier 28. The action of the first feedback loop is to ensure that the cavity 2 is maintained at a resonant frequency close to the mean frequency of the signal applied SW. The effects of this are two-fold, firstly cancellation of carrier component in the signal arm 6 is maintained and high power can therefore be continuously applied to the input arm 7 of the bridge 1. Secondly, the system is maintained within the operating region of the bridge where linear conversion of FM sidebands on the input arm 7 to AM sidebands on the output arm 6 is maintained.

A second control loop is provided by a directional coupling 29 (10 db) connected through a phase-shifter 30 to two ferrite modulators 31, 32 connected in parallel between two hybrid junctions 48, 49, and a further directional coupler 34 (eight db) feeding to the output arm 6 of the discriminator bridge before the input to the signal mixer 9.

The modulator 31 is connected in series with a quadrature phase-shift circuit 35. Balance impedances 36, 37, 38, 39 are also provided.

The modulator 31 is controlled by a signal from the second (amplitude modulation) phase-sensitive detector 22 which is fed to it through a channel 43 and a low-pass filter 44 and an amplifier 45.

The modulator 32 is controlled by a signal from the output of the first (frequency modulation) phase-sensitive detector 11, the signal being supplied through channel 40, low-pass filter 41 and an amplifier 42. This second control loop is incorporated into the system to allow measurements to be made when the signal applied is frequency modulated at low frequency but with high deviation. Such a signal commonly occurs in the system for which this measuring equipment is designed.

Without this cancellation loop, these low frequency signals would result in the transfer of a considerable amount of power into the arm 6 which would then be applied to the crystal mixer 9 (shown in FIG. 2), which would thereby be damaged, or possibly burnt out. The cancellation loop generates an equal and opposite microwave signal in the coupler 34 to reduce this low frequency component to a safe level.

Thus, if we consider that the input SW consists of a microwave signal with the undernoted characteristics, the discriminator described will successfully measure the unwanted components without damage or inaccuracy.

In operation the tuning mechanism 26, which is conveniently a motor-driven cavity tuning plunger, is controlled by amplified frequency error signals from the output of the phase-sensitive detector 11. The motor 27 is biassed so that the motor is not energised when the error is within a chosen range, e.g. ±40 kc./s. at an operating frequency of 10K mc./s.

Equal components of the carrier of the input signal from the source SW are obtained from the input arm 7 by means of the directional coupler 29 and the phase-shifter 30; the hybrid junction 49 dividing the input signal from the coupling 29 into two equal parts. The phase-shift circuit 35 ensures that the component fed to the modulator 31 is in quadrature with that fed to the modulator 32.

From the modulators 31, 32 the quadrature components are combined in the hybrid junction 48 and, by means of the directional coupler 34, applied to the bridge output before the input of the signal mixer 9. The amplitudes of the components are determined by the ferrite modulators 31, 32, under the control of the outputs of the phase-sensitive detectors 11 and 22. Thus, any small out-of-balance which exists, particularly when the cavity 2 is under the control of the tuning mechanism, is dealt with by these quadrature components of the input signal carrier fed into the signal mixer 9.

In a typical discriminator operating at 10K mc./s. (3 cm./s. wavelength) the I.F. (intermediate frequency) was chosen at 40 mc./s. and the second control loop had a gain of 55 db at frequencies up to 1 c./s. falling off beyond that frequency at 6 db per octave. This enables an overall balance better than 70 db to be attained: the input carrier power was 5W.

When starting, the discriminator may or may not be correctly phased throughout and the correct conditions are attained by adjustment of the phase-shifter 30, and the phase-shifter 14.

It may be noted that the discriminator is able to follow an FM transmission and still measure any AM or FM noise present on the carrier; this presupposes that the modulation frequency is well within the bandwidth of the second control loop.

Typical characteristics of the low-pass filters 41, 44 are:

| Frequency, c./s. | 0 | .94 | 1.59 | 2.75 | 6.16 | and thereafter −6 db/octave. |
|---|---|---|---|---|---|---|
| Response, db | 0 | −1 | −3 | −6 | −12 | |

Figure 3:
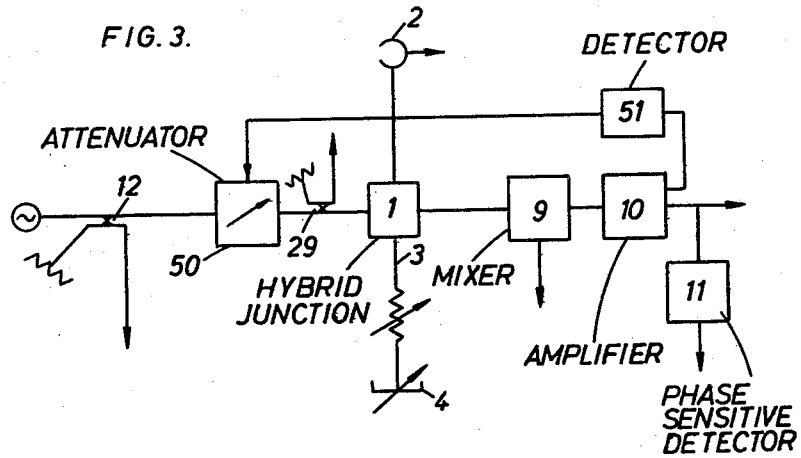
FIG. 3 is a diagram of a refinement of the circuit shown in FIG. 2.

A feature which could usefully be added is illustrated in FIG. 3, showing how the amplitude of the microwave leakage signal carrier at the mixer 9 can be limited automatically by inserting a ferrite attenuator 50 in the input waveguide 7 between the couplings 12 and 29 and controlling it by means of a signal from a detector 51 at the output of the IF amplifier 10.

An alternative arrangement has been devised for the second control loop in which two ferrite amplitude controllers themselves controlled by the outputs of the phase-sensitive detectors provide controlled mismatches, conveniently in the arm 3 of the bridge. Ferrite devices are known which can produce a voltage-standing-wave ratio in a waveguide of any magnitude and phase. Typically two stub slots spaced λ/8 apart and leading-off the walls of a main waveguide each contain a ferrite block within the field of an energising coil. Variation of current in the coils varies the magnitude and phase of a standing wave in the main waveguide. In the bridge the waveguide is connected across in series with the waveguide constituting arm 3 and a phase-adjuster is provided to assist in establishing correct phase relationships at starting up.

We claim:

1. A microwave frequency discriminator comprising a microwave bridge and two phase-sensitive detectors, the microwave bridge including an input arm, an output arm, a resonant cavity, an adjustable impedance, an arm connected to the resonant cavity and an arm connected to the adjustable impedance, a hybrid junction to which the arms are connected, the two phase-sensitive detectors each including two input arms and an output arm and being connected in parallel with each other, an output signal channel connected between the bridge output arm and an input arm of each phase-sensitive detector, a reference signal channel connected between the bridge input arm and the other input arm of each of the phase-sensitive detectors, means connected between an input arm of each phase-sensitive detector to apply to the second phase-sensitive detector a signal derived from, and in quadrature with, that applied to the first phase-sensitive detector, resonant cavity tuning means, and means to control the cavity tuning means, the control means being connected between the output arm of the first phase-sensitive detector and the cavity tuning means.

2. A discriminator as claimed in claim 1, in which the phase-sensitive detectors operate at intermediate frequency, the bridge output arm and the reference signal channel each including a mixer, the two mixers being fed by a common local oscillator.

3. A discriminator as claimed in claim 1, in which the reference signal channel includes a variable attenuator and a variable phase shifter.

4. A discriminator as claimed in claim 1, in which means are provided to produce controlled mismatches in one of the arms of the bridge, the degree of the mismatches being determined by the outputs of the two detectors.

5. A discriminator as claimed in claim 4, in which the said one arm comprises the balancing arm of the bridge, and the controlled mismatch producing means comprises two ferrite amplitude controllers connected to the output arms of the two phase-sensitive detectors.

6. A discriminator as claimed in claim 5, in which each amplitude controller is in the form of a ferrite block mounted within a stub waveguide leading off the main waveguide of the balancing arm, the block being within the field of a coil energised by the respective detector, the stub waveguides being spaced apart along the length of the main waveguide.

7. A microwave frequency discriminator comprising a microwave bridge and two phase-sensitive detectors, the microwave bridge including an input arm, an output arm, a resonant cavity, an adjustable impedance, an arm connected to the resonant cavity and an arm connected to the adjustable impedance, a hybrid junction to which the arms are connected, the two phase-sensitive detectors each including two input arms and an output arm and being connected in parallel with each other, an output signal channel connected between the bridge output arm and an input arm of each phase-sensitive detector, a reference signal channel connected between the bridge input arm and the other input arm of each of the phase-sensitive detectors, means connected between an input arm of each phase-sensitive detector to apply to the second phase-sensitive detector a signal derived from, and in quadrature with, that applied to the first phase-sensitive detector, resonant cavity tuning means, means to control the cavity tuning means, the control means being connected between the output arm of the first phase-sensitive detector and the cavity tuning means, means for introducing into the bridge output arm two signal components, of which one is in phase with, and of which the other is in quadrature with, the carrier of the signal applied to the bridge input arm, means to control the amplitude of one signal component, the means being connected to the output arm of the first phase-sensitive detector, and means to control the amplitude of the second signal component, the means being connected to the output arm of the second phase-sensitive detector.

8. A discriminator as claimed in claim 1, in which the resonant cavity tuning means comprises a tuning plunger within the cavity and the control means therefor comprises a motor operatively connected to the plunger and an amplifier connected between the output arm of the first phase-sensitive detector and the motor.

9. A discriminator as claimed in claim 1, including means for introducing into the bridge output arm two signal components, of which one is in phase with, and of which the other is in quadrature with, the carrier of the signal applied to the bridge input arm, a first modulator to control the amplitude of one of the signal components under the influence of the first phase-sensitive detector, a second modulator to control the amplitude of the other of the signal components under the influence of the second phase-sensitive detector, and means connected between the modulators and the output arm of the bridge to feed the modulated signal components to the output arm of the bridge before the first and second phase-sensitive detectors.

10. A discriminator as claimed in claim 9, in which a low pass filter and an amplifier are connected between each of the phase-sensitive detectors and its respective modulator.

References Cited by the Examiner

UNITED STATES PATENTS 2,770,729  11/56  Dicke _____ 331—9

DAVID G. REDINBAUGH, *Primary Examiner.*